United States Patent
Quinn et al.

(10) Patent No.: US 9,904,984 B1
(45) Date of Patent: Feb. 27, 2018

(54) WIRELESS COMMUNICATION DEVICE CONFIGURED TO CAPTURE ORIENTATION INFORMATION AND ORIENTATION INFORMATION GATHERING METHOD

(71) Applicant: Sprint Communications Company L.P., Overland Park, KS (US)

(72) Inventors: Jeffrey Michael Quinn, Fort Worth, TX (US); Justin Clay Eddings, Eudora, KS (US); Tony A. Stewart, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 61 days.

(21) Appl. No.: 14/032,458

(22) Filed: Sep. 20, 2013

(51) Int. Cl.
   *G06T 3/60* (2006.01)

(52) U.S. Cl.
   CPC ..................... *G06T 3/60* (2013.01)

(58) Field of Classification Search
   CPC .................... H04N 21/4222; H04L 67/38
   See application file for complete search history.

(56) References Cited

U.S. PATENT DOCUMENTS

| | | | | |
|---|---|---|---|---|
| 8,473,975 | B1* | 6/2013 | Besehanic | 725/10 |
| 2011/0228112 | A1* | 9/2011 | Kaheel | H04N 1/00127 348/208.4 |
| 2012/0231849 | A1* | 9/2012 | Yamashita | H04M 1/0245 455/566 |
| 2012/0274663 | A1 | 11/2012 | Laine et al. | |
| 2013/0033523 | A1 | 2/2013 | Stovicek et al. | |
| 2013/0057684 | A1* | 3/2013 | Iwai | G06Q 10/10 348/143 |
| 2013/0060641 | A1* | 3/2013 | Al Gharabally | G06Q 30/02 705/14.66 |
| 2013/0332064 | A1* | 12/2013 | Funk et al. | 701/409 |

* cited by examiner

Primary Examiner — Kee M Tung
Assistant Examiner — Grace Q Li (57) ABSTRACT

A wireless communication device configured to gather device orientation information and an orientation information gathering method in a wireless communication device are provided. The wireless communication device in one example embodiment includes an interface configured to communicate with a user and with external devices, a storage system configured to store at least an orientation detect routine and reference point information corresponding to two or more reference points on the wireless communication device, and a processing system coupled to the interface and the storage system and configured to determine if a predetermined orientation capture event has occurred, if the predetermined orientation capture event has occurred, then determine relative positions of the two or more reference points, save the relative positions of the two or more reference points to the orientation information and accumulate the orientation information for the wireless communication device, and transfer the orientation information to an external device or devices at intervals.

18 Claims, 7 Drawing Sheets

WIRELESS COMMUNICATION DEVICE CONFIGURED TO CAPTURE ORIENTATION INFORMATION AND ORIENTATION INFORMATION GATHERING METHOD

TECHNICAL BACKGROUND

Wireless communication devices are very popular and widespread. They are used for more and more applications, and in response software developers are providing more applications. For example, users may employ wireless communication devices for map applications, chat and messaging applications, shopping applications, image capturing, gaming, and social networking applications, among other things.

As wireless communication device applications become widespread and are relied upon to perform more and more tasks, it becomes increasingly important for developers to understand how wireless communication devices are being used in order to better design new wireless communication device applications. One aspect of wireless communication device use that developers are increasingly concerned about is how users hold and move their wireless communication devices. For example, it may be important for application developers to know if users are holding wireless communication devices in a landscape mode while using a particular application. If the particular application was developed to be used in a landscape mode orientation, the developer will want to know if users hold their wireless communication devices in a landscape mode orientation when using the particular application. Further, developers will want to know if users hold their wireless communication devices at unusual angles or move their wireless communication devices in unexpected ways while using applications.

Overview

Systems and methods for gathering and reporting wireless device orientation information are provided herein. In one example, a wireless communication device is configured to gather and report device orientation information and includes an interface configured to communicate with a user and with external devices, a storage system configured to store at least an orientation detect routine and reference point information corresponding to two or more reference points on the wireless communication device, and a processing system coupled to the interface and the storage system and configured to determine if a predetermined orientation capture event has occurred, if the predetermined orientation capture event has occurred, then determine relative positions of the two or more reference points, save the relative positions of the two or more reference points to the orientation information and accumulate the orientation information for the wireless communication device, and transfer the orientation information to an external device or devices at intervals.

In an example of an orientation information gathering method in a wireless communication device, the method includes, in the wireless communication device, determining if a predetermined orientation capture event has occurred, in the wireless communication device, if the predetermined orientation capture event has occurred, then determining relative positions of two or more reference points, in the wireless communication device, saving the relative positions of the two or more reference points to the orientation information and accumulating the orientation information for the wireless communication device, and in the wireless communication device, transferring the orientation information to an external device or devices at intervals.

In an example of a computer-readable storage media for an orientation information gathering method in a wireless communication device, the computer-readable storage media having program instructions stored thereon that, when executed by a processing system, directs the processing system to determine if a predetermined orientation capture event has occurred, if the predetermined orientation capture event has occurred, then determine relative positions of two or more reference points on the wireless communication device, save the relative positions of the two or more reference points to the orientation information and accumulate the orientation information for the wireless communication device, and transfer the orientation information to an external device or devices at intervals.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
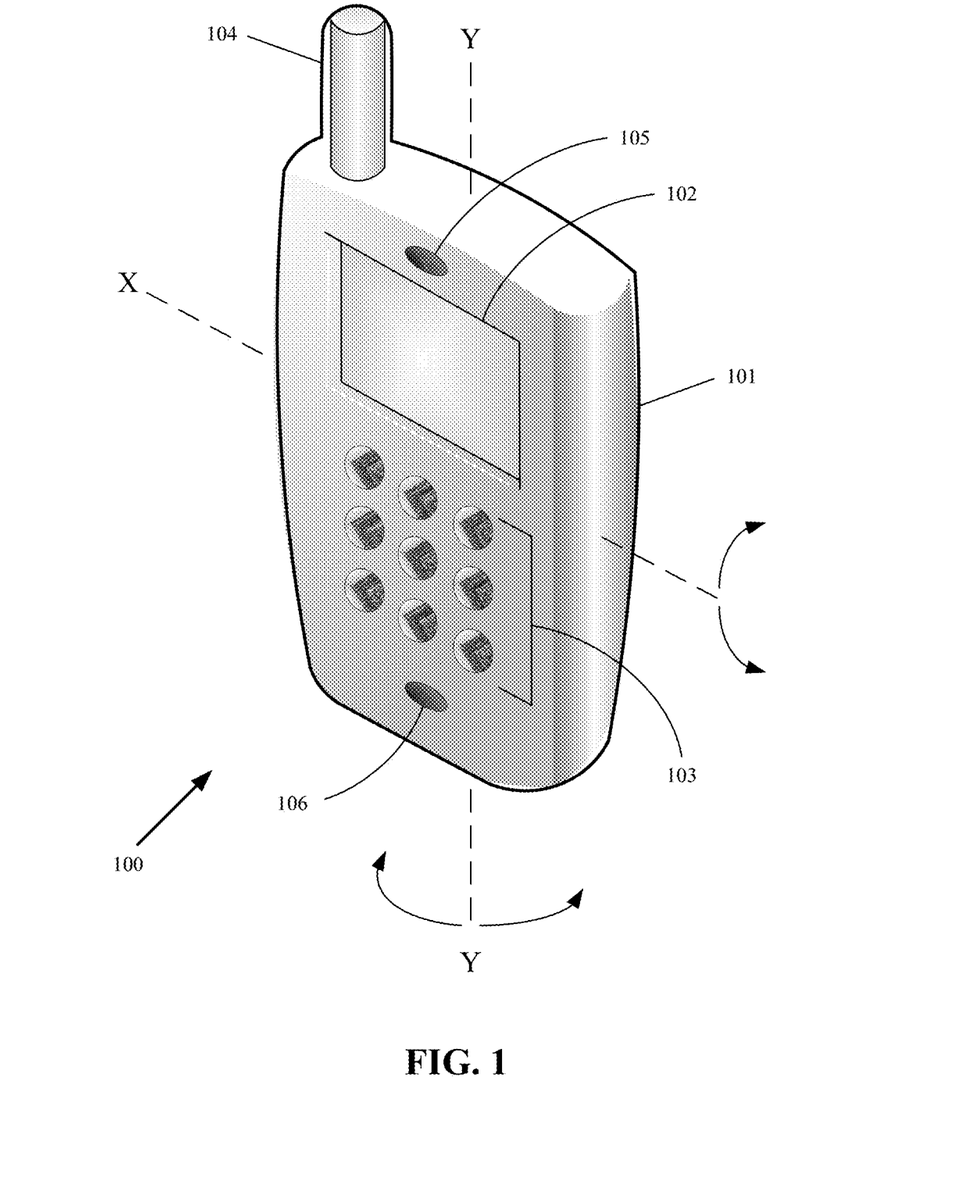
FIG. 1 shows an exemplary wireless communication device configured to capture orientation information.

FIG. 1 shows an exemplary wireless communication device 100 configured to provide orientation information. The wireless communication device 100 comprises a body 101, a display 102, a keyboard 103 (or other user input device), an antenna 104, a speaker 105 or other audio output device, and a microphone 106 or other audio input device. The wireless communication device 100 in some examples comprises a cellular phone or a satellite phone. However, it should be understood that the wireless communication device 100 can comprise any wireless portable device, including devices with integrated phone capabilities.

The wireless communication device 100 can be carried by a user and therefore may be operated in a variety of locations around the globe. Further, the wireless communication device 100 can be operated in a variety of orientations. The orientation of the wireless communication device 100 in use may depend on the preferences and proclivities of the user.

The orientation may also depend on the operation or function being performed by the wireless communication device 100. For example, if the user is capturing an image with the wireless communication device 100, the user may change the orientation based on the subject in the image, the available lighting, the distance to the subject, and other factors.

If the user is playing a game on the wireless communication device 100, the orientation can depend on factors such as the difficulty in seeing the screen, the game play and game actions, and how the user interacts with the game. Consequently, the orientations that the users of such wireless communication devices 100 commonly use may be of great interest to software developers. Further, developers may be interested in knowing how the orientations correspond to an event occurring in the wireless communication device 100 or an application being executed by the wireless communication device 100.

The wireless communication device 100 can be thought of as having a tilt axis X and a rotate axis Y. The two axes X and Y correspond to positions with respect to the earth. The Y or rotate axis is vertical with respect to the earth's surface, while the X or tilt axis is horizontal or parallel to the earth's surface. If the wireless communication device 100 rotates around the Y axis, the position of reference points on the wireless communication device 100 will not change with respect to the earth. If the wireless communication device 100 rotates around the X or tilt axis, the position of at least some of the reference points on the wireless communication device 100 will change with respect to the earth.

Figure 2:
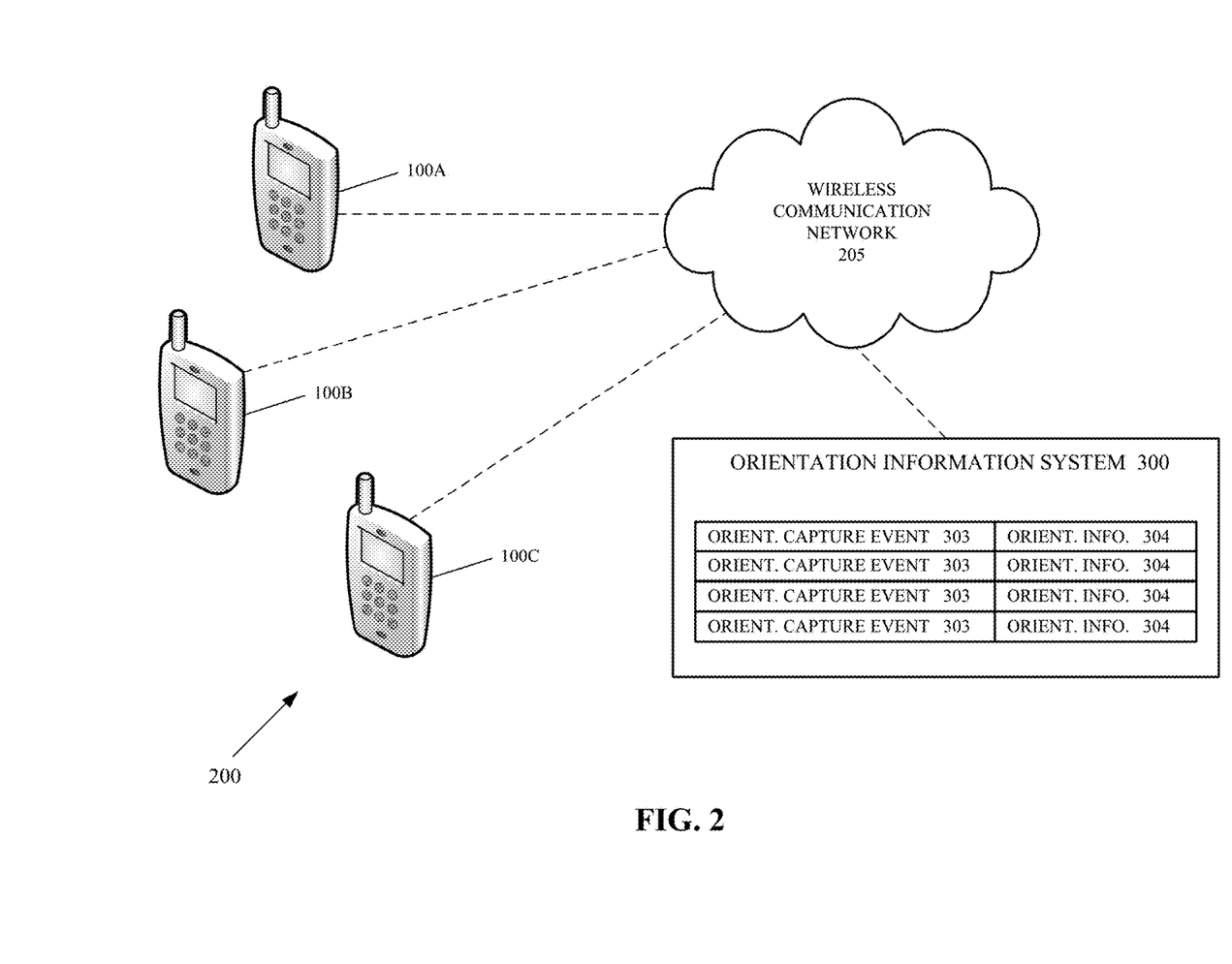
FIG. 2 shows an exemplary wireless communication environment including a wireless communication network, an orientation information system, and one or more wireless communication devices.

FIG. 2 shows an exemplary wireless communication environment 200 including a wireless communication network 205, an orientation information system 300, and one or more wireless communication devices 100, such as the three wireless communication devices 100A-100C in the example shown. The one or more wireless communication devices 100 and the orientation information system 300 can communicate with the wireless communication network 205. The one or more wireless communication devices 100 and the orientation information system 300 can communicate with other devices via the wireless communication network 205.

The wireless communication network 205 in the example shown can comprise a cellular telephone network. The wireless communication network 205 can further be linked to other wired or wireless networks.

The orientation information system 300 is configured to receive and store multiple instances of orientation information 304 from the one or more wireless communication devices 100. The orientation information system 300 can comprise a storehouse for accumulating large number of entries of orientation information 304 from a large number of wireless communication devices 100. A developer or developers can access the orientation information system 300 and use the orientation information 304 for refining an existing wireless communication device application and in designing and developing new wireless communication device applications. Having access to a large number of instances of the orientation information 304 can help a developer in understanding user actions, spotting potential operational difficulties, and exploiting all capabilities of a wireless communication device 100. For example, the developer may find that users are rotating the device to choose a screen orientation that was not anticipated by the developer. As a result, the developer could discover that users do not like the existing presentation mode of information on the wireless communication device 100.

In addition, the orientation information system 300 can store orientation capture events 304. The predetermined orientation capture event can be stored along with the corresponding relative positions of the two or more reference points (i.e., the orientation information 304 derived from the relative positions of the two or more reference points 109). The orientation capture event 303 can comprise an event corresponding to and which triggered the orientation of the wireless communication device 100. Consequently, each instance of orientation information 304 can be accompanied by a stored orientation capture event 303. For example, if the user is playing a game on a wireless communication device 100, the wireless communication device 100 may capture the orientation at key points in time or at key operational events, such as the selection of an item in the game, for example.

Figure 3:
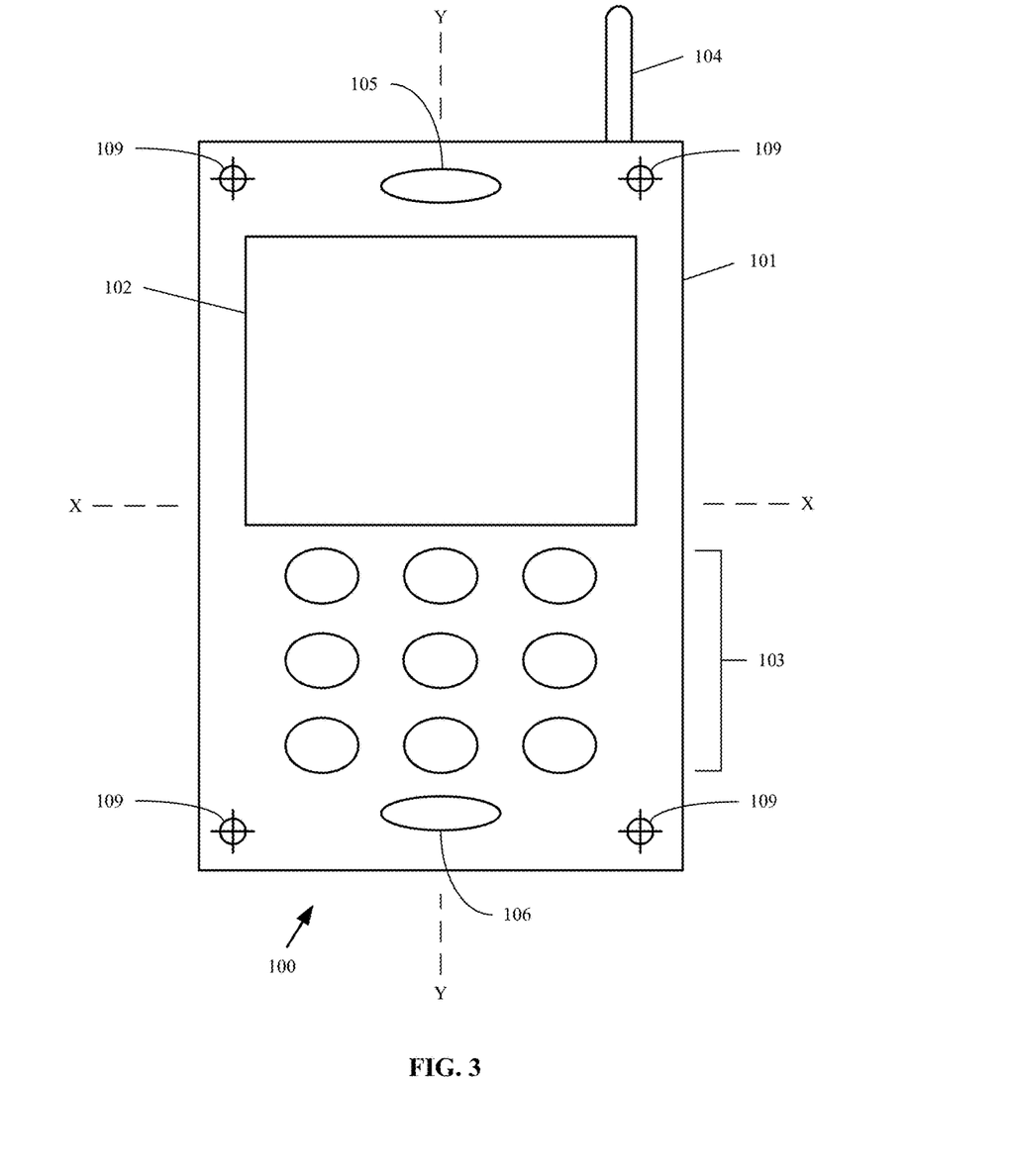
FIG. 3 shows a front or face view of an exemplary wireless communication device.

FIG. 3 shows a front or face view of an exemplary wireless communication device 100. This figure shows two or more reference points 109 of the wireless communication device 100. At a very minimum, two reference points 109 are needed in order to determine at least some orientation information for the wireless communication device 100. However, using only two reference points 109 would not provide orientation information if the wireless communication device 100 were rotated about an axis extending through the two reference points 109. Three reference points would need to be used to guarantee that all orientations of the wireless communication device 100 could be detected and quantified. In the example shown, four reference points 109 are included in the wireless communication device 100, but other numbers of reference points 109 could also be used.

Figure 4:
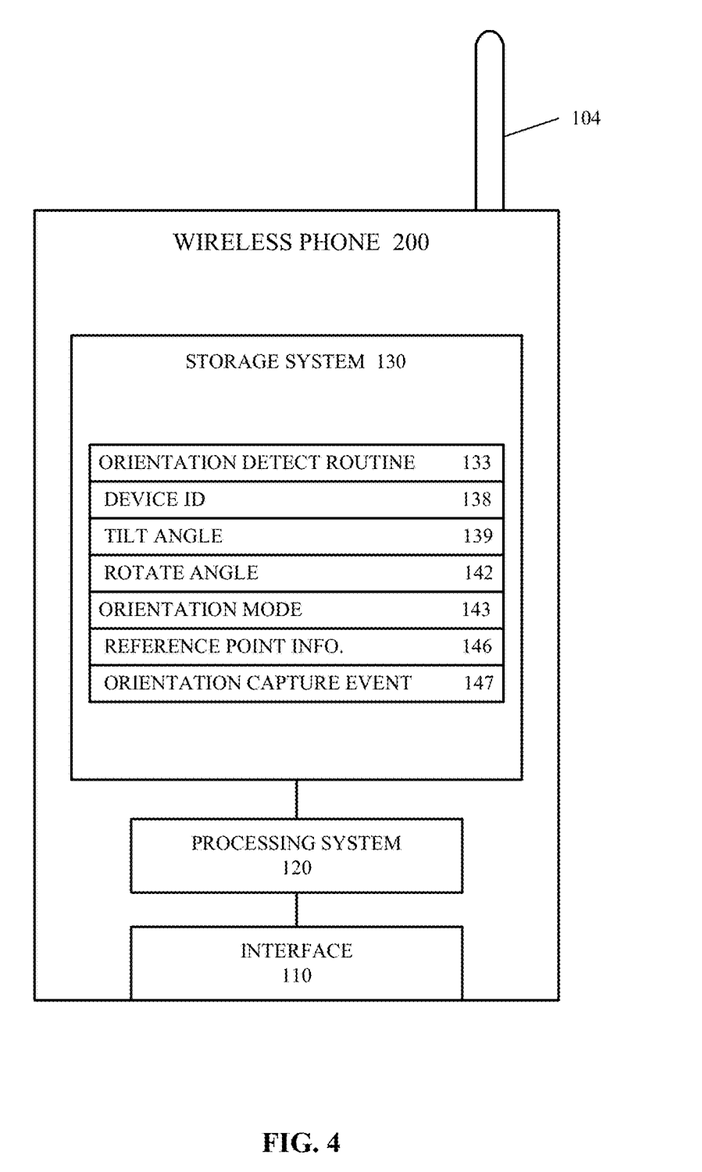
FIG. 4 shows an exemplary wireless communication device.

FIG. 4 shows an exemplary wireless communication device 200. The wireless communication device 200 of FIG. 4 maybe the same as or different from the wireless communication device 100 of FIGS. 1-3. In addition to the components previously discussed, the wireless communication device 200 comprises an interface 110, a storage system 130, and a processing system 120. The processing system 120 is coupled to the interface 110 and to the storage system 130.

The interface 110 is configured to communicate with a user and with external devices.

The storage system 130 stores various software routines, working data, permanent data, and any other needed information or values. The storage system 130 in the example shown stores an orientation detect routine 133, a device ID 138, a tilt angle 139, a rotate angle 142, an orientation mode 143, a reference point information 146, and an orientation capture event 147, among other things.

The orientation detect routine 133 monitors the two or more reference points 109 of the wireless communication device 200 and generates the reference point information 146. The orientation detect routine 133 can further generate more specific information, including generating the tilt angle 139 (i.e., a quantification of a relative rotational position around the X axis) and generating the rotate angle 142 (i.e., a quantification of a relative rotational position around the Y axis). Moreover, the orientation detect routine 133 can generate the orientation mode 143, with the orientation mode 143 comprising commonly-accepted orientations (see discussion below).

In addition, in some examples the orientation detect routine 133 transfers the accumulated orientation information to other devices or systems, such as to the orientation information system 300. The accumulated orientation information can include one or more of the tilt angle 139, the rotate angle 142, the orientation mode 143, the reference point information 146, and the orientation capture event 147. In addition, the device ID 138 can optionally be included in the accumulated orientation information.

The orientation detect routine 133 can transfer the accumulated orientation information at intervals. The orientation detect routine 133 can transfer the accumulated orientation information at predetermined time intervals, when a predetermined amount of orientation information has been accumulated, or when requested by the orientation information system 300 or similar system. Alternatively, or in addition, the orientation detect routine 133 can transfer the accumulated orientation information upon the occurrence of predetermined events, such as upon sending or receiving a telephone call, sending or receiving a text message, opening a browser or other software application, capturing an image, executing a predetermined software application or encountering a predetermined object or action in the predetermined application, for example. This listing is given merely for illustration and is not exhaustive.

The device ID 138 comprises an identifier of the wireless communication device 200 or application loaded in the wireless communication device 200. The device ID 138 in some examples comprises an Electronic Serial Number (ESN), a System Identification Code (SID), a Mobile Identification Number (MIN), a Mobile Subscription Identification Number (MSIN), an International Mobile Subscriber Identity (IMSI), a Mobile Station ID (MSID), or a Mobile Device Number (MDN). However, other device identifiers are contemplated and are within the scope of the description and claims. Alternatively, the device ID 138 can comprise an identifier that is included in a software application loaded into the wireless communication device 200, for example.

The tilt angle 139 comprises a quantification of a relative rotational position around the X axis. The quantification can be with respect to the earth and with respect to a vertical axis extending vertically from the surface of the earth 99. The quantification can be with respect to and/or generated with GPS coordinates obtained from the Global Positioning System (GPS).

The quantification can comprise forward and backward angles of the front or face of the wireless communication device 200 with respect to vertical. The tilt angle 139 in some examples comprises a positive angle (+α) from the vertical, with the top front of the wireless communication device 200 being angled backward with respect to the bottom front of the wireless communication device 200 (see FIG. 5). The tilt angle 139 in other examples comprises a negative angle (−α) from the vertical, with the top front of the wireless communication device 200 being angled forward with respect to the bottom front of the wireless communication device 200 (see FIG. 6).

The rotate angle 142 comprises a quantification of a relative rotational position around the Y axis. The quantification can be with respect to the earth and with respect to a predetermined demarcation of latitude, longitude, or other local or global positional reference (see FIG. 7). The quantification can be with respect to and/or generated with GPS coordinates obtained from the Global Positioning System (GPS).

The orientation mode 143 comprises a classification of the wireless communication device's orientation into a commonly-used or accepted orientation mode. For example, the orientation mode 143 can comprise a landscape mode, wherein the Y axis of the wireless communication device 200 is held to be approximately or nearly horizontal with respect to the earth. Alternatively, the orientation mode 143 can comprise a portrait mode, wherein the Y axis of the wireless communication device 200 is held to be approximately or nearly vertical. It should be understood that in some orientations of the wireless communication device 200, the orientation mode 143 will not store a value or state that corresponds to either a landscape mode or a portrait mode.

The reference point information 146 comprises position or orientation information obtained at a point in time for the two or more reference points 109 of the wireless communication device 200. The reference point information 146 comprises position or orientation information for each reference point 109 of the two or more reference points 109. The reference point information 146 can comprise three-dimensional position or orientation information for each reference point 109. As a result, by processing the position or orientation information for each reference point 109, the orientation of the wireless communication device 200 as a whole can be determined from the reference point information 146.

It should be understood that one or more of the tilt angle 139, the rotate angle 142, the orientation mode 143, and the reference point information 146 may comprise the orientation information 304 of FIG. 2.

The orientation capture event 147 comprises information about the event that triggered an orientation capture. For example, if orientation information is obtained when an image is being captured by the wireless communication device 200, then the image capture event may be captured along with the orientation information. The image capture event may be useful for extracting only image capture orientation information from a large amount of accumulated orientation information. Further, a developer may want to correlate a particular operational event to actual orientations and common orientations by users.

The predetermined orientation capture event can comprise any predetermined event wherein orientation information is desired to be captured. For example, the predetermined orientation capture event can comprise the opening and execution of a particular software application resident on the wireless communication device or can comprise the wireless communication device encountering a predetermined object or action in the application. As a further example, the predetermined orientation capture event can comprise sending or receiving a telephone call, sending or receiving a text message, opening a web browser, capturing an image, or using a predetermined application. However, this listing is not exhaustive. It should be understood that additional predetermined capture events are contemplated and are within the scope of the description and claims.

The orientation detect routine 133 can be implemented in program instructions and among other functions which can, when executed by the wireless communication device 200 in general or the processing system 120 in particular, operates to direct the wireless communication device 200 or the processing system 120 to determine if a predetermined orientation capture event has occurred, if the predetermined orientation capture event has occurred, then determine relative positions of the two or more reference points, save the relative positions of the two or more reference points to the orientation information and accumulate the orientation information for the wireless communication device, and transfer the orientation information to an external device or devices at intervals.

Figure 5:
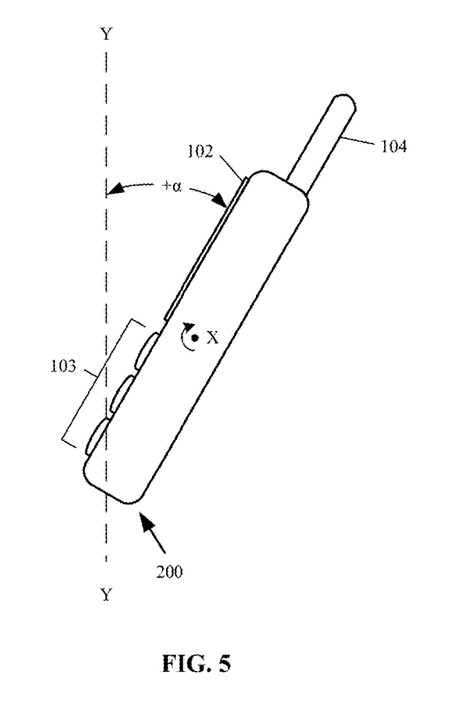
FIG. 5 shows the wireless communication device tilted backward about the X axis.

FIG. 5 shows the wireless communication device 200 tilted backward about the X axis. The wireless communication device 200 is therefore displaced by a (+α) tilt angle 139 from the vertical (i.e., from the Y axis).

Figure 6:
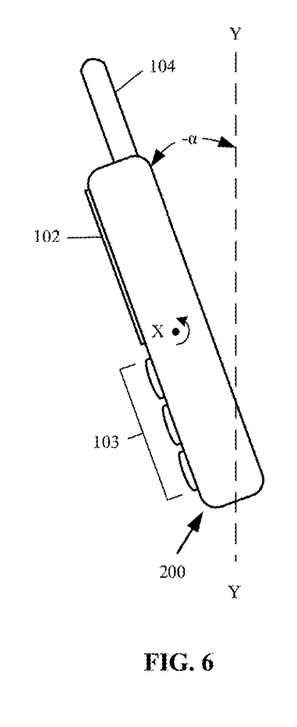
FIG. 6 shows the wireless communication device tilted forward about the X axis.

FIG. 6 shows the wireless communication device 200 tilted forward about the X axis. The wireless communication device 200 is therefore displaced by a (−α) tilt angle 139 from the vertical (i.e., from the Y axis).

Figure 7:
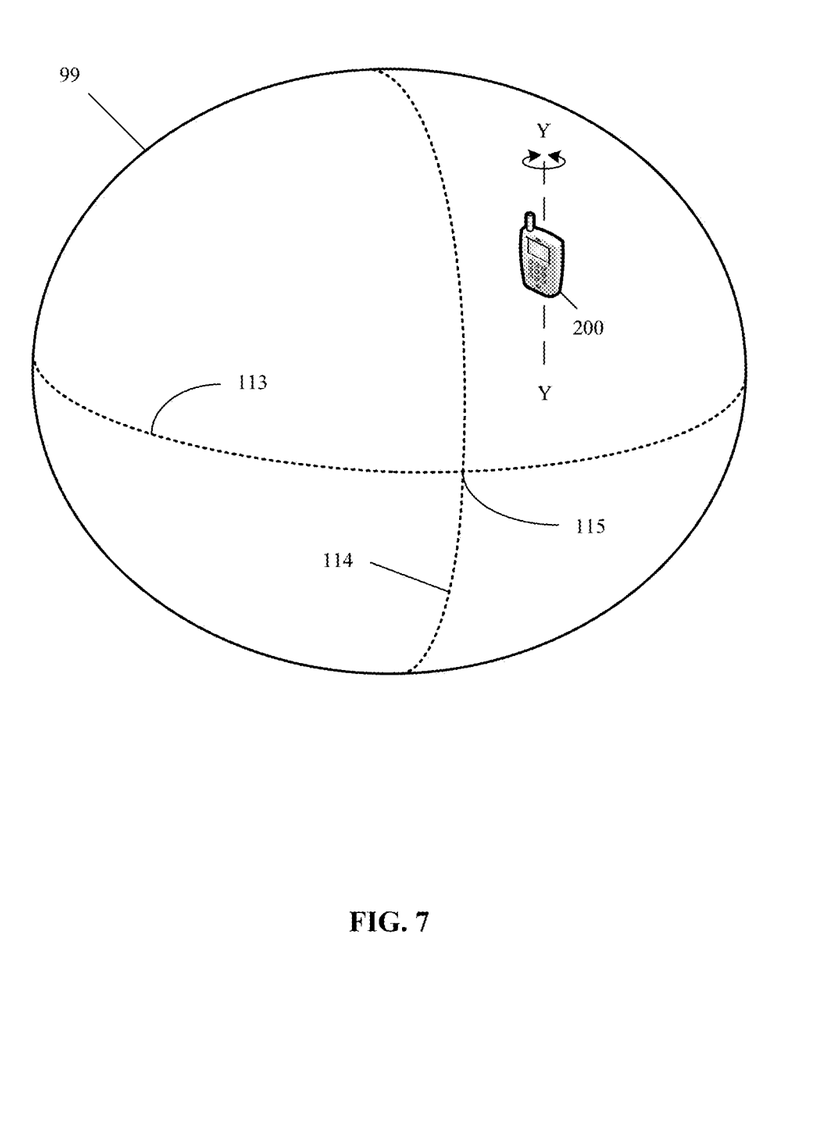
FIG. 7 shows the wireless communication device being rotated about the Y axis.

FIG. 7 shows the wireless communication device 200 being rotated about the Y axis. The rotate angle 142 may be measured with respect to the earth 99. The rotate angle 142 may be measured with respect to an intersection 115 of a predetermined latitude 113 and a predetermined longitude 114 of the earth 99, for example. However, other processes for determining the rotate angle 142 are contemplated and are within the scope of the description and claims.

Figure 8:
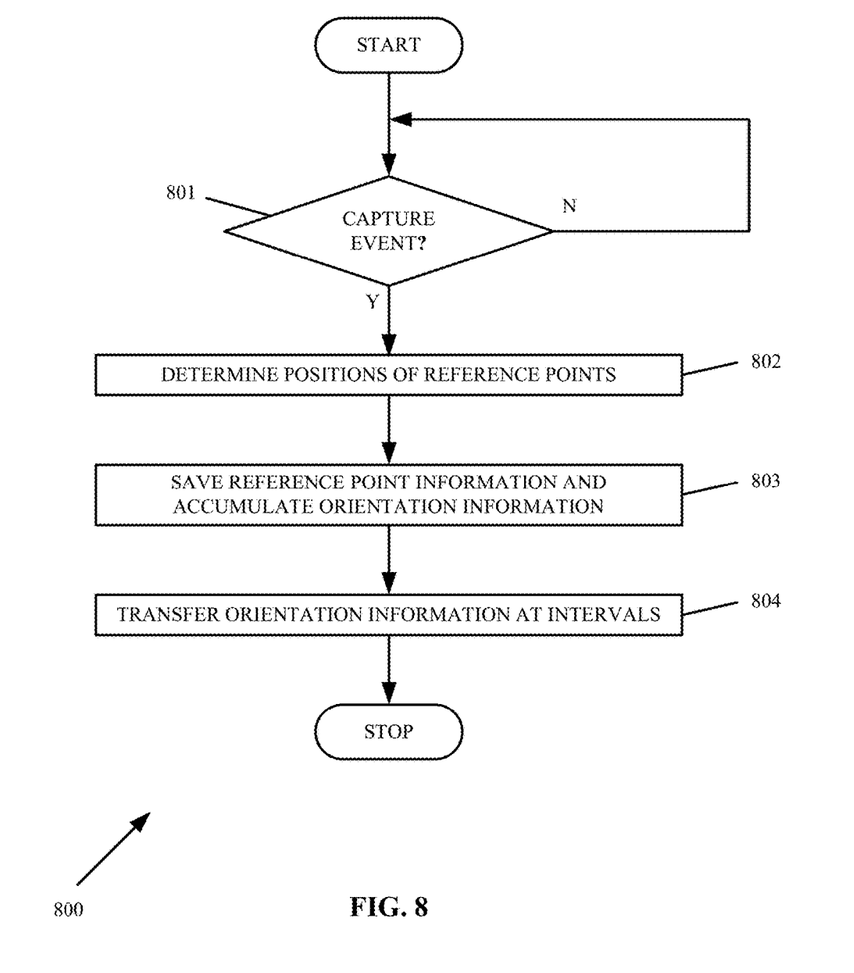
FIG. 8 shows a flowchart of an exemplary orientation information gathering method in a wireless communication device.

FIG. 8 shows a flowchart 800 of an exemplary orientation information gathering method in a wireless communication device. In step 801, the method determines whether a predetermined orientation capture event has occurred, as previously discussed. If a predetermined orientation capture event has occurred, then the method proceeds to step 802. Otherwise, where a predetermined orientation capture event has not occurred, the method loops back and waits for a predetermined orientation capture event to occur before capturing orientation information for the wireless communication device.

In step 802, wherein a predetermined orientation capture event has occurred, the wireless communication device determines the relative positions or locations of two or more reference points, as previously discussed.

In step 803, the wireless communication device saves the reference point information and accumulates the reference point information as the orientation information. The accumulated orientation information comprises the captured positions/locations of the two or more reference points, including multiple captures occurring over time. The captures can occur upon predetermined orientation capture events, as previously described.

In step 804, the accumulated orientation information is transferred to an external device or devices at intervals. As previously discussed, the transfer can occur at predetermined times or can occur when requested by the external device or devices.

The external device or devices can comprise a device or devices of a software application developer in some examples. The software application developer can receive the accumulated orientation information and use the accumulated orientation information to more completely understand how users are interacting with their wireless communication devices and how users are interacting with the applications that are installed and executing on users' wireless communication devices.

The wireless communication network 205 can provide communication services including voice calls, text messages, data access, or other communication services provided over cellular or wireless communication networks. In some examples, the wireless communication network 205 includes equipment to provide wireless access to communication services within different coverage areas to user devices, route communications between content providers and user devices, and facilitate handoffs between equipment of different coverage areas, among other operations.

Wireless network protocols that may be utilized by the wireless communication device 100 or 200 and the wireless communication network 205 include Code Division Multiple Access (CDMA), Evolution-Data Optimized (EVDO), single-carrier radio transmission technology link (1xRTT), Global System for Mobile Communication (GSM), Universal Mobile Telecommunications System (UMTS), High Speed Packet Access (HSPA), Radio Link Protocol (RLP), 3rd Generation Partnership Project (3GPP) Worldwide Interoperability for Microwave Access (WiMAX), Long Term Evolution (LTE), LTE Advanced, Orthogonal Frequency-Division Multiple Access (OFDMA), Single-carrier frequency-division multiple access (SC-FDMA), Wideband Code Division Multiple Access (W-CDMA), Time Division Synchronous Code Division Multiple Access (TD-SCDMA), IEEE 802.11, Wireless Fidelity (Wi-Fi), or some other cellular or wireless communication format, including combinations, improvements, or variations thereof.

The wireless communication device 100 or 200 may be a mobile device, including a cellular phone, but also may include other devices. The wireless communication device 100 or 200 in some examples can comprise subscriber equipment, customer equipment, an access terminal, a smartphone, a telephone, a mobile wireless telephone, a personal digital assistant (PDA), a computer, an e-book, a mobile Internet appliance, a wireless network interface card, a media player, a game console, or some other wireless communication apparatus, including combinations thereof.

The wireless communication device 100 or 200 can include one or more antennas, transceiver circuitry elements, and communication elements. The wireless communication device 100 or 200 may include one or more transceiver portions for communication over one or more wireless links of differing frequency bands. The transceiver circuitry typically includes amplifiers, filters, modulators, and signal processing circuitry. The wireless communication device 100 or 200 can also include user interface systems, memory devices, non-transitory computer-readable storage mediums, software, processing circuitry, or some other communication components.

The wireless communication device 100 or 200 can receive wireless access information from infrastructure of the wireless communication network 205, such as beacon signals, channel information, frequency information, overhead signaling, neighbor lists, and the like. The wireless communication device 100 or 200 can move among any of the coverage areas associated with the wireless communication network 205 and receive wireless access.

The processing system 120 can comprise one or more microprocessors and other circuitry that retrieves and executes the orientation detect routine 133 from the storage system 130. The processing system 120 can be implemented within a single processing device but can also be distributed across multiple processing devices or sub-systems that cooperate in executing program instructions. Examples of the processing system 120 include general purpose central processing units, application specific processors, and logic devices, as well as any other type of processing device, combinations, or variations thereof.

The orientation detect routine 133 comprise computer programs, firmware, or some other form of machine-readable processing instructions. The orientation detect routine 133 may include an operating system, utilities, drivers, network interfaces, applications, virtual machines, or some other type of software. The orientation detect routine 133 can include additional processes, programs, or components, such as operating system software, database software, or application software. The orientation detect routine 133 can also comprise firmware or some other form of machine-readable processing instructions executable by the processing system 120.

In general, the orientation detect routine 133 can, when loaded into the processing system 120 and executed, transform the processing system 120 into a special-purpose computing system configured to exchange communications with the wireless communication network 205 and the orientation information system 300, among other operations. Encoding the orientation detect routine 133 on the storage system 130 can transform the physical structure of the storage system 130. The specific transformation of the physical structure can depend on various factors in different implementations of this description. Examples of such factors can include, but are not limited to the technology used to implement the storage media of the storage system 130 and whether the computer-storage media are characterized as primary or secondary storage. For example, if the computer-storage media are implemented as semiconductor-based memory, the orientation detect routine 133 can transform the physical state of the semiconductor memory when the program is encoded therein. For example, the orientation detect routine 133 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

The interface 110 interacts with users to obtain user data and to exchange wireless communications with a wireless network or networks and with other wireless devices, as well as receive selections and/or other input from the user. The interface 110 comprises a network card, network interface, port, or interface circuitry that allows the wireless communication device 100 or 200 to communicate with a user and to communicate with other devices. The interface 110 may also include a memory device, software, processing circuitry, or some other device. The interface 110 may exchange wireless communications with the wireless communication network 205.

The interface 110 comprises components to allow a user to interface with the wireless communication device 100 or 200. Examples of the equipment and circuitry for receiving user input and control include graphical user interfaces, push buttons, touch screens, selection knobs, dials, switches, actuators, keys, keyboards, pointer devices, microphones, transducers, potentiometers, non-contact sensing circuitry, accelerometers, or other human-interface equipment. The interface 110 also includes equipment to communicate information to a user of the wireless communication device 100 or 200. Examples of the equipment to communicate information to the user could include displays, graphical user interfaces, indicator lights, lamps, light-emitting diodes, haptic feedback devices, audible signal transducers, speakers, buzzers, alarms, vibration devices, or other indicator equipment, including combinations thereof.

Data may be stored in and recalled from the storage system 130. The storage system 130 can comprise any computer readable storage media readable by the processing system 120 and capable of storing the orientation detect routine 133. The storage system 130 can include volatile and nonvolatile, removable and non-removable media implemented in any method or technology for storage of information, such as computer readable instructions, data structures, program modules, or other data. The storage system 130 may be independent from or integrated into the processing system 120.

In addition to storage media, in some implementations the storage system 130 can also include communication media over which the orientation detect routine 133 can be communicated. The storage system 130 can be implemented as a single storage device but can also be implemented across multiple storage devices or sub-systems co-located or distributed relative to each other. The storage system 130 can comprise additional elements, such as a controller, capable of communicating with the processing system 120. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A wireless communication device configured to gather device information, the wireless communication device comprising:
    an interface configured to communicate with a user and with external devices;
    a storage system configured to store at least an orientation detect routine and reference point information corresponding to two or more reference points on the wireless communication device; and
    a processing system coupled to the interface and the storage system and configured to determine when a telephone call event has occurred in the wireless communication device, wherein the telephone call event comprises sending or receiving a telephone call that triggers capture of orientation information, when the telephone call event has occurred, then determine the orientation information corresponding to the telephone call comprising relative positions of the two or more reference points, store the telephone call event along with the orientation information corresponding to the telephone call event, and transfer accumulated orientation information to at least one external device upon occurrence of a predetermined event, the accumulated orientation information comprising the orientation information corresponding to the telephone call event accompanied by the telephone call event.

2. The wireless communication device of claim 1, wherein the processing system is further configured to store additional orientation information accompanied by another telephone call event event that triggers capture of the additional orientation information.

3. The wireless communication device of claim 1, wherein the processing system configured to determine the orientation information comprising the relative positions of the two or more reference points comprises the processing system configured to classify the relative positions of the two or more reference points into a predetermined orientation mode.

4. The wireless communication device of claim 1, wherein the processing system configured to determine the orientation information comprising the relative positions of the two or more reference points comprises the processing system configured to classify the relative positions of the two or more reference points into a predetermined orientation mode including at least a portrait mode and a landscape mode.

5. The wireless communication device of claim 1, wherein the orientation information comprises a tilt angle and a rotate angle of the wireless communication device.

6. The wireless communication device of claim 1, wherein the processing system configured to transfer the accumulated orientation information to the at least one external device upon occurrence of the predetermined event comprises the processing system configured to transfer the accumulated orientation information upon execution of a predetermined software application.

7. A method to operate a wireless communication device to facilitate gathering device information, the method comprising:
in the wireless communication device, determining when a telephone call event has occurred in the wireless communication device, wherein the telephone call event comprises sending or receiving a telephone call that triggers capture of orientation information; and
in the wireless communication device, when the telephone call event has occurred, then determining the orientation information corresponding to the telephone call comprising relative positions of two or more reference points on the wireless communication device, storing the telephone call event along with the orientation information corresponding to the telephone call event, and transferring the accumulated orientation information to at least one external device upon occurrence of a predetermined event, the accumulated orientation information comprising the orientation information corresponding to the telephone call event accompanied by the telephone call event.

8. The method of claim 7, further comprising storing additional orientation information accompanied by another telephone call event that triggers capture of the additional orientation information.

9. The method of claim 7, wherein determining the orientation information comprising the relative positions of the two or more reference points comprises classifying the relative positions of the two or more reference points into a predetermined orientation mode.

10. The method of claim 7, wherein determining the orientation information comprising the relative positions of the two or more reference points comprises classifying the relative positions of the two or more reference points into a predetermined orientation mode including at least a portrait mode and a landscape mode.

11. The method of claim 7, wherein the orientation information comprises a tilt angle and a rotate angle of the wireless communication device.

12. The method of claim 7, wherein transferring the accumulated orientation information to the at least one external device upon occurrence of the predetermined event comprises transferring the accumulated orientation information upon execution of a predetermined software application.

13. One or more computer-readable storage media having program instructions stored thereon for gathering device information in a wireless communication device that, when executed by a processing system, direct the processing system to at least:
determine when a telephone call event has occurred in the wireless communication device, wherein the telephone call event comprises sending or receiving a telephone call that triggers capture of orientation information;
when the telephone call event has occurred, then determine the orientation information corresponding to the telephone call comprising relative positions of two or more reference points on the wireless communication device, store the telephone call event along with the orientation information corresponding to the telephone call event, and transfer accumulated orientation information to at least one external device upon occurrence of a predetermined event, the accumulated orientation information comprising the orientation information corresponding to the telephone call event accompanied by the telephone call event.

14. The computer-readable storage media of claim 13, wherein the program instructions are further configured to direct the processing system to store additional orientation information accompanied by another telephone call event that triggers capture of the additional orientation information.

15. The computer-readable storage media of claim 13, wherein the program instructions configured to direct the processing system to determine the orientation information comprising the relative positions of the two or more reference points comprises the program instruction configured to direct the processing system to classify the relative positions of the two or more reference points into a predetermined orientation mode.

16. The computer-readable storage media of claim 13, wherein the program instructions configured to direct the processing system to determine the orientation information comprising the relative positions of the two or more reference points comprises the processing system configured to classify the relative positions of the two or more reference points into a predetermined orientation mode including at least a portrait mode and a landscape mode.

17. The computer-readable storage media of claim 13, wherein the orientation information comprises a tilt angle and a rotate angle of the wireless communication device.

18. The computer-readable storage media of claim 13 wherein the program instructions configured to direct the processing system to transfer the accumulated orientation information to the at least one external device upon occurrence of the predetermined event comprises the program instructions configured to direct the processing system to transfer the accumulated orientation information upon execution of a predetermined software application.

* * * * *